US009438074B2

(12) United States Patent
Lee et al.

(10) Patent No.: US 9,438,074 B2
(45) Date of Patent: Sep. 6, 2016

(54) APPARATUS AND METHOD FOR TRANSMITTING WIRELESS POWER

(71) Applicant: Samsung Electronics Co., Ltd., Gyeonggi-do (KR)

(72) Inventors: Kyung-Woo Lee, Seoul (KR); Kang-Ho Byun, Suwon-si (KR); Se-Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 846 days.

(21) Appl. No.: 13/717,312

(22) Filed: Dec. 17, 2012

(65) Prior Publication Data

US 2013/0154387 A1 Jun. 20, 2013

Related U.S. Application Data

(60) Provisional application No. 61/576,050, filed on Dec. 15, 2011.

(30) Foreign Application Priority Data

Oct. 4, 2012 (KR) ........................ 10-2012-0109999

(51) Int. Cl.
*H04B 1/707* (2011.01)
*H02J 17/00* (2006.01)
*H02J 7/00* (2006.01)
*H02J 7/02* (2016.01)

(52) U.S. Cl.
CPC .................. *H02J 17/00* (2013.01); *H02J 7/00* (2013.01); *H02J 7/025* (2013.01)

(58) Field of Classification Search
USPC ......................................................... 307/104
See application file for complete search history.

(56) References Cited

U.S. PATENT DOCUMENTS 6,175,739 B1 * 1/2001 Ishii ...................... H04W 36/06
455/452.1

(Continued)

FOREIGN PATENT DOCUMENTS

| EP | 2 328 253 A2 * | 6/2011 | ............. H02J 5/005 |
|----|----------------|--------|-------------------------|
| KR | 100748094 | 8/2007 | |
| KR | 1020100069979 | 6/2010 | |

OTHER PUBLICATIONS

Master Table of Contents & Compliance Requirements, Specification of the Bluetooth System, Covered Core Package version: 4.0, Specification vols. 0-6, Jun. 30, 2010.

*Primary Examiner* — Ronald W Leja
(74) *Attorney, Agent, or Firm* — The Farrell Law Firm, P.C.

(57) ABSTRACT

A method and a wireless power transmitter are provided for transmitting wireless power to at least one wireless power receiver. The method includes setting, by the wireless power transmitter, a search channel to be used for communication with the at least one wireless power receiver; detecting at least one of an energy level and a Received Signal Strength Indication (RSSI) value of a signal received on the search channel; and determining whether to designate the search channel as a communication channel based on the detection results.

26 Claims, 11 Drawing Sheets

(56) References Cited

U.S. PATENT DOCUMENTS

| | | | |
|---|---|---|---|
| 9,203,464 B2* | 12/2015 | Kim | H04B 1/707 |
| 2007/0091813 A1* | 4/2007 | Richard | H04W 72/085 |
| | | | 370/248 |
| 2010/0151808 A1 | 6/2010 | Toncich et al. | |
| 2010/0248667 A1 | 9/2010 | Daugherty, Jr. et al. | |
| 2011/0127843 A1 | 6/2011 | Karaoguz et al. | |
| 2013/0154387 A1* | 6/2013 | Lee | H02J 17/00 |
| | | | 307/104 |
| 2013/0154557 A1* | 6/2013 | Lee | H02J 7/0052 |
| | | | 320/108 |
| 2013/0154558 A1* | 6/2013 | Lee | H02J 7/0052 |
| | | | 320/108 |
| 2014/0253028 A1* | 9/2014 | Lee | H02J 17/00 |
| | | | 320/108 |

* cited by examiner

FIG.7

| Channel List No | Channel | Address | RSSI | Address | RSSI | Address | RSSI | Address | RSSI | Address | RSSI | Address | RSSI | Noise Level |
|---|---|---|---|---|---|---|---|---|---|---|---|---|---|---|
| #1 | 11 | ' | ' | ' | ' | ' | ' | ' | ' | ' | ' | ' | ' | |
| #2 | 24 | ' | ' | ' | ' | ' | ' | ' | ' | ' | ' | ' | ' | |
| #3 | 15 | ' | ' | ' | ' | ' | ' | ' | ' | ' | ' | ' | ' | |
| #4 | 20 | ' | ' | ' | ' | ' | ' | ' | ' | ' | ' | ' | ' | |

| Status | WiFi interference (on wifi Ch1) | WPT Power | Wifi Traffic | Transmitted frame | Retransmitted frame | Transmitting failure | Failure rate (%) |
|---|---|---|---|---|---|---|---|
| WPT not present | ON | 0 dBm | UDP 100MB/sec | 129843642 | 13806842 | 3034 | 0.002337 |
| 5 device concurrent charge | ON | 0 dBm | UDP 100MB/sec | 136219574 | 29792757 | 6193 | 0.004546 |

FIG.9B

APPARATUS AND METHOD FOR TRANSMITTING WIRELESS POWER

PRIORITY

This application claims priority under 35 U.S.C. §119(e) to U.S. Provisional Patent Application Ser. No. 61/576,050, which was filed in the U.S. Patent and Trademark Office on Dec. 15, 2011, and under 35 U.S.C. §119(a) to Korean Patent Application Serial No. 10-2012-0109999, which was filed in the Korean Intellectual Property Office on Oct. 4, 2012, the entire disclosure of each of which is incorporated herein by reference.

BACKGROUND OF THE INVENTION

1. Field of the Invention

The present invention relates generally to a method and a transmitter for transmitting wireless power.

2. Description of the Related Art

Recently, wireless or non-contact charging technologies have been developed, which are now widely used for a variety of electronic devices, such as wireless electric toothbrushes or wireless electric shavers.

Using wireless charging technology, which is based on wireless power transmission and reception, a battery of an electronic device, such as a mobile phone, may be automatically recharged if, for example, a user simply places the mobile phone on a charging pad, without connecting a separate charging connector to the mobile phone.

Wireless charging technologies may be roughly classified into a coil-based electromagnetic induction scheme, a resonant scheme, and a Radio Frequency (RF)/microwave radiation scheme, which delivers electrical energy by converting it into microwaves.

Although the electromagnetic induction scheme has been used more often, recently, experiments using an RF/microwave radiation scheme have been successful. Thus, it is expected that in the near future, more types of electronic products will be recharged wirelessly.

The electromagnetic induction-based power transmission transmits power between a primary coil and a secondary coil. For example, an induced current occurs, when a magnet is moved around a coil. Using this principle, a transmitter generates a magnetic field, and in a receiver, a current is induced depending on a change in magnetic field, thereby producing energy. This power transmission method has excellent energy transmission efficiency.

As for the resonant scheme, power can be wirelessly transferred to an electronic device by using the Coupled Mode Theory, even though the electronic device is located several meters away from a charging device. The resonant scheme is based on a physics concept, wherein if a tuning fork rings, a nearby wine glass may also ring at the same frequency. However, the resonant scheme resonates electromagnetic waves containing electrical energy, instead of resonating sounds. The resonated electrical energy is directly delivered only to devices having the same resonant frequency, and any unused portion is reabsorbed as electromagnetic fields, instead of being spread into the air. Thus, unlike other electromagnetic waves, the resonated electrical energy should not affect adjacent devices and a human body.

Although wireless charging schemes are garnering a great deal of attention and research, no standard has been proposed for the priority of wireless charging, a search for a wireless power transmitter and receiver, a selection of a communication frequency between the wireless power transmitter and receiver, an adjustment of wireless power, a selection of matching circuits, and a distribution of communication time for each wireless power receiver in one charging cycle. In particular, new technology is required for a wireless power transmitter to determine a channel with which it will communicate with a wireless power receiver.

SUMMARY OF THE INVENTION

Accordingly, the present invention is designed to address at least the problems and/or disadvantages described above and to provide at least the advantages described below.

An aspect of the present invention is to provide a standard for an overall operation of a wireless power transmitter and receiver.

Another aspect of the present invention is to provide a method and a wireless power transmitter that selects a communication channel for transmitting power, while minimizing conflicts with other communications channels.

In accordance with an aspect of the present invention, a method is provided for transmitting wireless power, by a wireless power transmitter, to at least one wireless power receiver. The method includes setting, by the wireless power transmitter, a search channel to be used for communication with the at least one wireless power receiver; detecting at least one of an energy level and a Received Signal Strength Indication (RSSI) value of a signal received on the search channel; and determining whether to designate the search channel as a communication channel based on the detection results.

In accordance with another aspect of the present invention, a wireless power transmitter is provided for transmitting wireless power to at least one wireless power receiver. The wireless power transmitter includes a controller that sets a search channel to be used for communication with the at least one wireless power receiver; and a communication unit that receives a signal on the search channel. The controller detects at least one of an energy level and a Received Signal Strength Indication (RSSI) value of the received signal, and determines whether to designate the search channel as a communication channel, based on the detection results.

BRIEF DESCRIPTION OF THE DRAWINGS

The above and other aspects, features, and advantages of certain embodiments of the present invention will be more apparent from the following description taken in conjunction with the accompanying drawings, in which:

FIG. 7 illustrates a channel search result table according to an embodiment of the present invention;

FIG. 9B illustrates execution results of a network system according to an embodiment of the present invention.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of certain embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
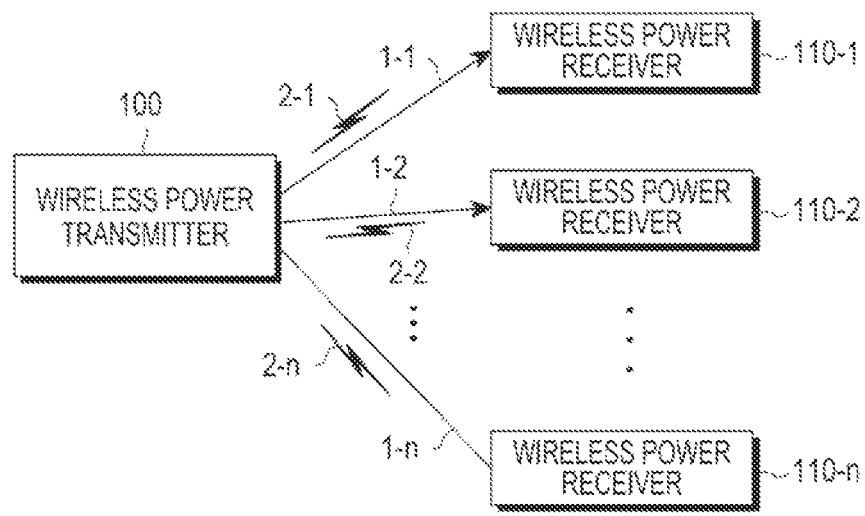
FIG. 1 illustrates an operation of a wireless charging system according to an embodiment of the present invention.

FIG. 1 illustrates an overall operation of a wireless charging system according to an embodiment of the present invention.

Referring to FIG. 1, the wireless charging system includes a wireless power transmitter 100 and wireless power receivers 110-1, 110-2 and 110-n. The wireless power transmitter 100 wirelessly transmits power 1-1, 1-2, and 1-n to the wireless power receivers 110-1, 110-2, and 110-n, respectively. More specifically, the wireless power transmitter 100 wirelessly transmits powers 1-1, 1-2, and 1-n only to the wireless power receivers that are authorized by performing a predetermined authentication procedure.

The wireless power transmitter 100 forms electrical connections with the wireless power receivers 110-1, 110-2, and 110-n. For example, the wireless power transmitter 100 transmits wireless power in the form of an electromagnetic wave to the wireless power receivers 110-1, 110-2, and 110-n.

Additionally, the wireless power transmitter 100 performs bi-directional communication with the wireless power receivers 110-1, 110-2, and 110-n. The wireless power transmitter 100 and the wireless power receivers 110-1, 110-2, and 110-n process and exchange packets 2-1, 2-2, and 2-n, each packet consisting of predetermined frames. The wireless power receivers 110-1, 110-2, and 110-n may be implemented as, for example, mobile communication terminals, a Personal Digital Assistants (PDAs), a Personal Multimedia Player (PMP), a smart phone, etc.

The wireless power transmitter 100 wirelessly supplies power to the wireless power receivers 110-1, 110-2 and 110-n, e.g., by the resonant scheme. When the wireless power transmitter 100 uses the resonant scheme, the distance between the wireless power transmitter 100 and the wireless power receivers 110-1, 110-2, and 110-n may be preferably 30 m or less. However, when the wireless power transmitter 100 uses the electromagnetic induction scheme, the distance between the wireless power transmitter 100 and the wireless power receivers 110-1, 110-2, and 110-n may be preferably 10 cm or less.

The wireless power receivers 110-1, 110-2, and 110-n charge a battery mounted therein by receiving wireless power from the wireless power transmitter 100. Further, the wireless power receivers 110-1, 110-2, and 110-n may transmit, to the wireless power transmitter 100, a signal requesting the transmission of the wireless power, information for receiving the wireless power, status information of the wireless power receiver, control information for the wireless power transmitter 100, etc.

The wireless power receivers 110-1, 110-2, and 110-n may send a message indicating their charging status to the wireless power transmitter 100.

The wireless power transmitter 100 may include a display that displays a status of each of the wireless power receivers 110-1, 110-2, and 110-n based on the messages received from the wireless power receivers 110-1, 110-2, and 110-n. In addition, the wireless power transmitter 100 may display an estimated time remaining until the wireless power receivers 110-1, 110-2, and 110-n will be fully charged.

Further, the wireless power transmitter 100 may transmit a control signal for disabling the wireless charging function of the wireless power receivers 110-1, 110-2, and 110-n. Basically, upon receiving the disable control signal for the wireless charging function from the wireless power transmitter 100, a wireless power receiver will disable the wireless charging function.

Figure 2:
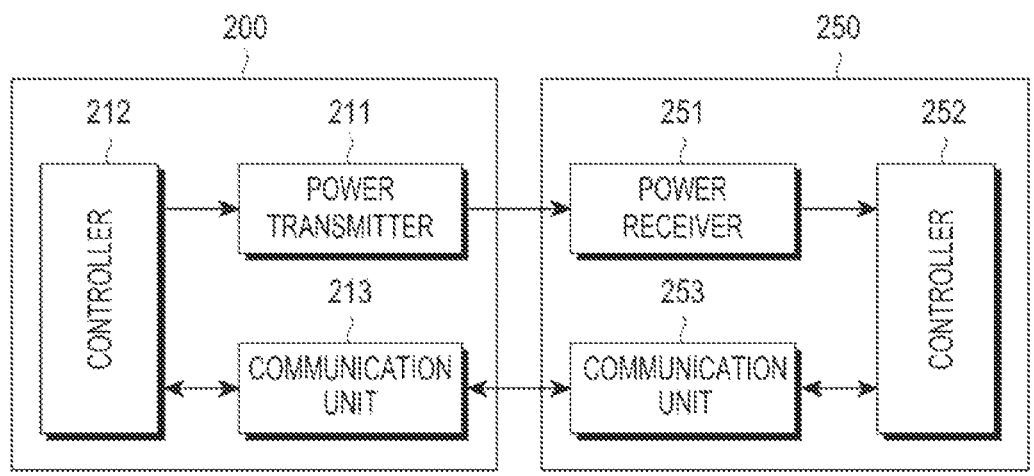
FIG. 2 illustrates a wireless power transmitter and a wireless power receiver according to an embodiment of the present invention.

FIG. 2 illustrates a wireless power transmitter and a wireless power receiver according to an embodiment of the present invention.

Referring to FIG. 2, a wireless power transmitter 200 includes a power transmitter 211, a controller 212, and a communication unit 213. A wireless power receiver 250 includes a power receiver 251, a controller 252, and a communication unit 253. Herein, the term unit refers to a hardware device or a combination of hardware and software.

The power transmitter 211 wirelessly supplies the power to the wireless power receiver 250 via the power receiver 250. The power transmitter 211 supplies power in an Alternating Current (AC) waveform. However, when the power transmitter 211 receives its power as a Direct Current (DC) waveform, e.g., from a battery, the power transmitter 211 supplies the power as an AC waveform, after converting the DC waveform into an AC waveform using an inverter. The power transmitter 211 may be implemented as a built-in battery, or may be implemented as a power receiving interface, which receives power from an outside source, e.g., an outlet, and supplies it to other components. It will be understood by those of ordinary skill in the art that the power transmitter 211 has no limit as long as it is capable of supplying power in an AC waveform.

Additionally, the power transmitter 211 may provide AC waveforms to the wireless power receiver 250 in the form of an electromagnetic wave. Accordingly, the power transmitter 211 may also include an additional loop coil, so that it may transmit or receive predetermined electromagnetic waves. When the power transmitter 211 is implemented with a loop coil, an inductance L of the loop coil is subject to change. It will be understood by those of ordinary skill in the art that the power transmitter 211 has no limit as long as it is capable of transmitting and receiving electromagnetic waves.

The controller 212 controls the overall operation of the wireless power transmitter 200, e.g., using an algorithm, program, or application, which is read out from a memory (not shown). The controller 212 may be implemented as a Central Processing Unit (CPU), a microprocessor, a mini-computer, etc.

The communication unit 213 communicates with the communication unit 253 in the wireless power receiver 250 using Near Field Communication (NFC), Zigbee, Infrared Data Association (IrDA), Visible Light Communication (VLC), etc. Additionally, the communication unit 213 may perform communication using the Zigbee communication scheme defined in the IEEE 802.15.4 standard. In addition, the communication unit 213 may use a Carrier Sense Multiple Access/Collision Avoidance (CSMA/CA) algorithm.

The communication unit 213 transmits signals associated with information about the wireless power transmitter 200. For example, the communication unit 213 may unicast, multicast, or broadcast the signals.

Table 1 below shows a frame structure of a notice signal transmitted from the wireless power transmitter 200, e.g., at stated periods, according to an embodiment of the present invention.

TABLE 1

| frame type | protocol version | sequence number | network ID | RX to Report (schedule mask) | Reserved | Number of Rx |
|---|---|---|---|---|---|---|
| Notice | 4 bits | 1 Byte | 1 Byte | 1 Byte | 5 bits | 3 bits |

In Table 1, the 'frame type' field, which indicates a type of the signal, indicates that the signal is a notice signal. Further, the 'protocol version' field, which indicates a type of a communication protocol, is allocated, e.g., 4 bits, and the 'sequence number' field, which indicates a sequential order of the signal, is allocated, e.g., 1 byte. The sequence number increases, e.g., in response to a transmission/reception step of the signal.

The 'network ID' field, which indicates a network ID of the wireless power transmitter 200, is allocated, e.g., 1 byte, and the 'Rx to Report (schedule mask)' field, which indicates wireless power receivers that will report to the wireless power transmitter 200, is allocated, e.g., 1 byte.

Table 2 below shows an example of the 'Rx to Report (schedule mask)' field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 correspond to first to eighth wireless power receivers, respectively. Based on Table 2, a wireless power receiver whose schedule mask number is represented as '1', i.e., Rx6, Rx7, and Rx8, may make a report.

In Table 1, the 'Reserved' field, which is reserved for its future use, is allocated, e.g., 5 bits, and the 'Number of Rx' field, which indicates the number of wireless power receivers adjacent to the wireless power transmitter 200, is allocated, e.g., 3 bits.

The signal in the form of the frame in Table 1 may be implemented such that it is allocated to Wireless Power Transmission (WPT) in the IEEE 802.15.4 frame structure.

Table 3 shows the IEEE 802.15.4 frame structure.

TABLE 3

| Preamble | SFD | Frame Length | WPT | CRC16 |
|---|---|---|---|---|

As shown in Table 3, the IEEE 802.15.4 frame structure includes 'Preamble', 'Start Frame Delimiter (SFD)', 'Frame Length', 'WPT', and 'Cyclic Redundancy Check (CRC)16' fields. The frame structure shown in Table 1 may be included in the WPT field of Table 3.

The communication unit 213 receives power information from the wireless power receiver 250. The power information may include at least one of a capacity of the wireless power receiver 250, a battery level, a charging count, usage, a battery capacity, and a battery ratio. The communication unit 213 transmits a charging function control signal for controlling the charging function of the wireless power receiver 250. For example, the charging function control signal may enable or disable the charging function by controlling the power receiver 251 in the specific wireless power receiver 250.

The communication unit 213 also receives signals other wireless power transmitters (not shown). For example, the communication unit 213 may receive a notice signal in the form of Table 1 from another wireless power transmitter.

The controller 212 may determine a channel it will use for communicating with the wireless power receiver 250, based on the signal from another wireless power transmitter (not shown), which is received from the communication unit 213. For example, the controller 212 may determine a channel it will use for communicating, based on a Received Signal Strength Indication (RSSI) or an energy level of a signal from another wireless power transmitter. In particular, the controller 212 may determine a channel that avoids conflicts with another wireless power transmitter or with other communications channels, such as a Wi-Fi channel.

Although FIG. 2 illustrates the power transmitter 211 and the communication unit 213 in different hardware structures, the power transmitter 211 and the communication unit 213 may be configured in a single hardware structure.

Figure 3A:
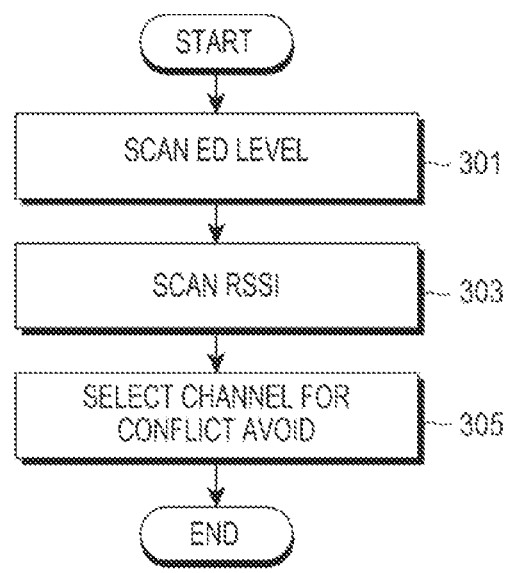
FIG. 3A is a flowchart illustrating a channel selection process in a wireless power transmitter according to an embodiment of the present invention.

FIG. 3A is a flowchart illustrating a channel selection process in a wireless power transmitter according to an embodiment of the present invention.

Referring to FIG. 3A, a wireless power transmitter receives electromagnetic energy from an outside source. Specifically, the wireless power transmitter scans a detected Energy Detection (ED) level of input electromagnetic energy in step S301.

In step S303, the wireless power transmitter scans an RSSI of a received signal (e.g., a notice signal) that is periodically transmitted from another wireless power transmitter.

In step S305, the wireless power transmitter selects a communication channel that will avoid conflicts with a channel used by another wireless power transmitter or a channel used by other communications, based on at least one of the ED level scanning result and the RSSI scanning result. For example, the wireless power transmitter determines a communication channel by measuring or scanning an ED level and an RSSI for each channel.

For example, the wireless power transmitter determines a searched channel whose energy level or RSSI scanning result is a minimum, as a communication channel. Particularly, in accordance with an embodiment of the present invention, the wireless power transmitter scans an energy level for a frequency in a relatively wide range, based on the Quadrature Phase Shift Keying (QPSK) modulation scheme.

In addition, as the energy level is scanned, a communication channel may be efficiently determined regardless of modulation.

If an ED level input from a specific channel is greater than or equal to a predetermined threshold, the wireless power transmitter may not use the channel as a communication channel. In addition, if an RSSI of a signal received from a specific channel is greater than or equal to a predetermined threshold, the wireless power transmitter may not use the channel as a communication channel.

Alternatively, the wireless power transmitter may perform communication based on the IEEE 802.15.4 standard, which has channels 11 to 26. A relationship between channels and frequencies in the IEEE 802.15.4 standard is as shown in Table 4 below. A frequency unit in Table 4 is kHZ.

TABLE 4

| Frequency | | | | | | | | | | | | | | | |
|---|---|---|---|---|---|---|---|---|---|---|---|---|---|---|---|
| 2405 | 2410 | 2415 | 2420 | 2425 | 2430 | 2435 | 2440 | 2445 | 2450 | 2455 | 2460 | 2465 | 2470 | 2475 | 2480 |
| channel 11 | 12 | 13 | 14 | 15 | 16 | 17 | 18 | 19 | 20 | 21 | 22 | 23 | 24 | 25 | 26 |

The wireless power transmitter performs the ED level scanning and the RSSI scanning in order of channel 11, channel 24, channel 15, and channel 20.

More recent wireless power receivers (e.g., smart phones) include a Wi-Fi communication module, in addition to a communication module for communication with the wireless power transmitter.

Figure 3B:
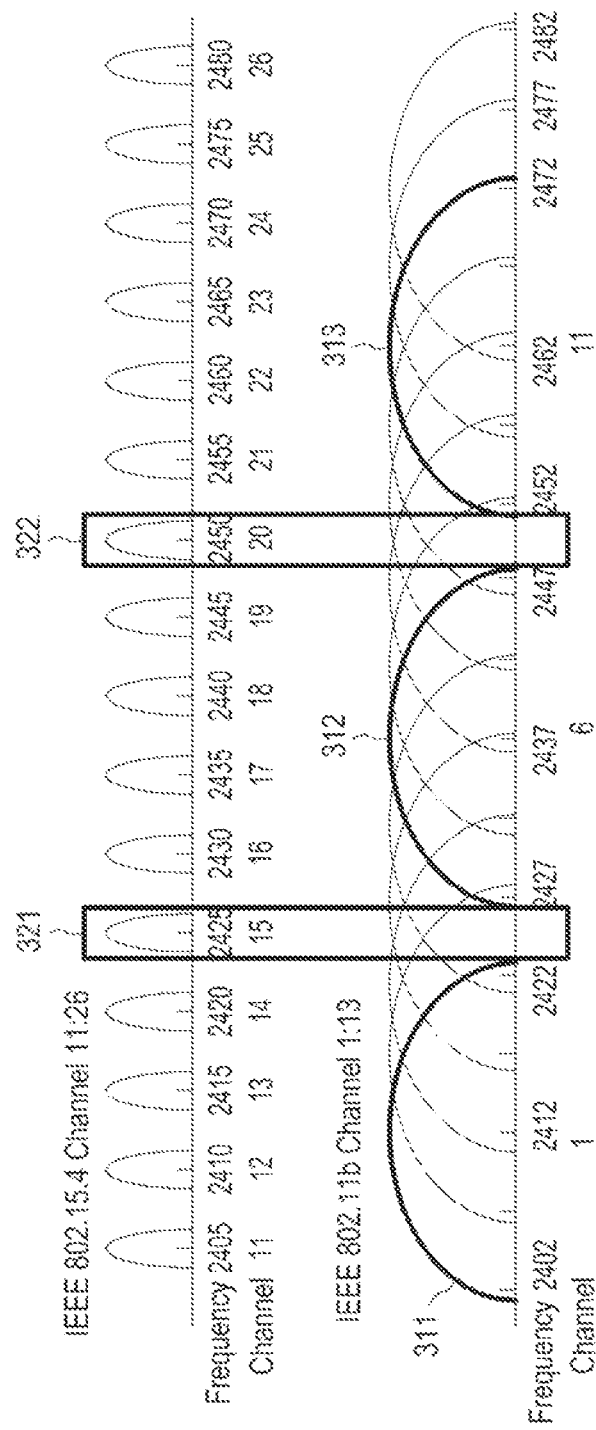
FIG. 3B illustrates a comparison in available frequency between a wireless power receiver and a Wi-Fi communication scheme.

FIG. 3B illustrates comparisons in available frequency between a wireless power receiver and a Wi-Fi communication scheme. Specifically, the upper graph of FIG. 3B is for the IEEE 802.15.4 standard that uses the frequencies and channels as defined in Table 4. Further, the lower graph of FIG. 3B is for the frequencies used in Wi-Fi, e.g., IEEE 802.11® 2007.

Referring to FIG. 3B, a Wi-Fi channel #1 311 uses frequencies of about 2402 to 2422 kHz, a Wi-Fi channel #6 312 uses frequencies of about 2427 to 2447 kHz, and a Wi-Fi channel #11 313 uses frequencies of about 2452 to 2472 kHz. Therefore, the IEEE 802.15.4 channels, which do not correspond (321 and 322) to available Wi-Fi frequencies or which correspond to high-level Wi-Fi signals, may be channels 11, 15, 20 and 24. Accordingly, the wireless power transmitter may perform at least one of ED level scanning and RSSI scanning for channels 11, 15, 20 and 24.

Channel 26 may be excluded by U.S. regulations.

Further, the wireless power transmitter may scan ED values or RSSIs with respect to channel 11 or 24 first, because channel 11 or 24 is an interference-minimized channel, as it is positioned at the end of the Wi-Fi channels.

Figure 3C:
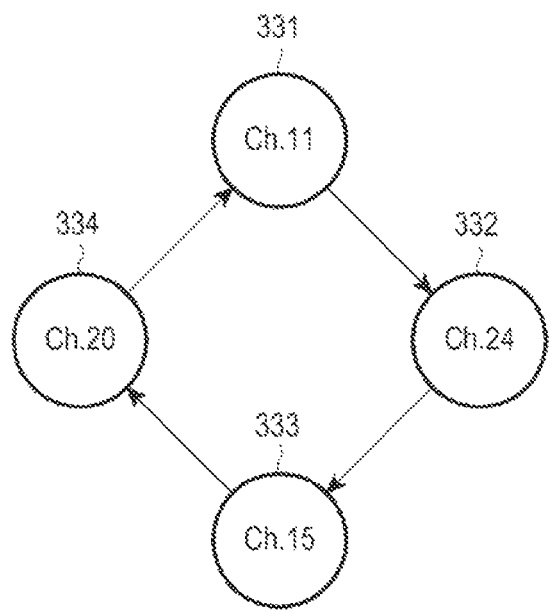
FIG. 3C illustrates a search order by a wireless power transmitter.

FIG. 3C illustrates a search order by a wireless power transmitter.

Referring to FIG. 3C, the wireless power transmitter searches for channel #11 331, channel #24 332, channel #15 333, and channel #20 334, in order. The start channel where the wireless power transmitter performs channel search or channel scanning is subject to change.

In accordance with an embodiment of the present invention, the channel search order may be determined in such a manner that the wireless power transmitter first searches for channel #11 331 and then searches for channel #24 332, which is the farthest channel from the previously searched channel.

Additionally, the first searched channel may be determined at random.

As described above, the wireless power transmitter determines, as a communication channel, a channel that minimizes conflicts with other communications or with a communication channel used by another wireless power transmitter. In particular, the wireless power transmitter uses channels 11, 15, 20, and 24 from among the 16 channels defined in the IEEE 802.15.4 standard.

Figure 4:
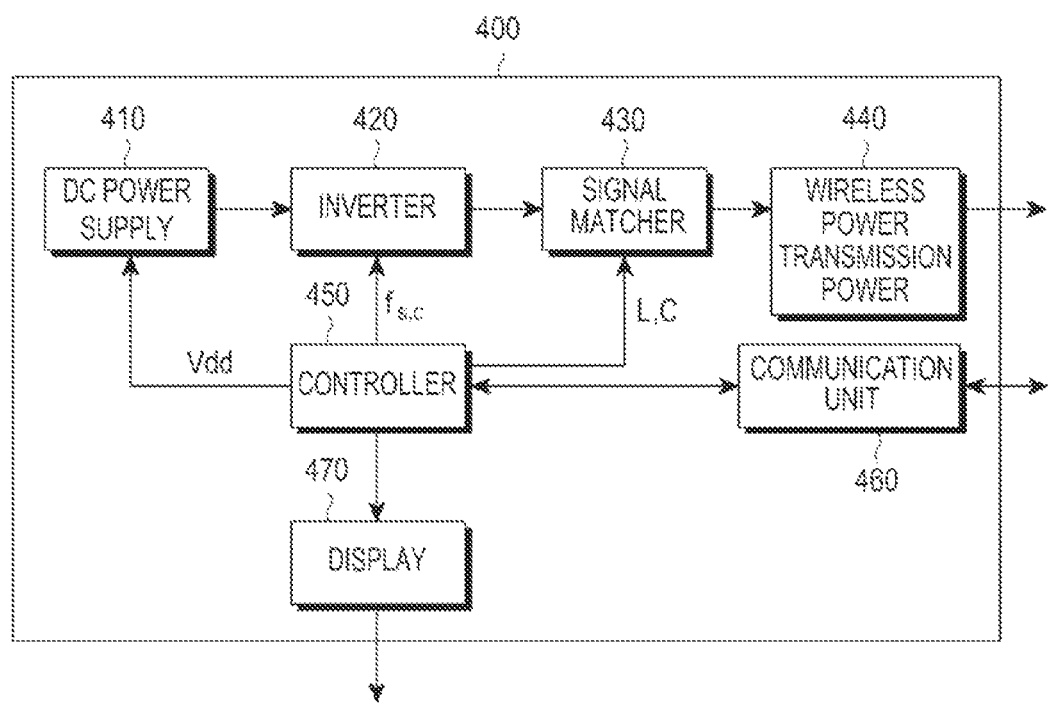
FIG. 4 illustrates a wireless power transmitter according to an embodiment of the present invention.

FIG. 4 illustrates a wireless power transmitter according to an embodiment of the present invention.

Referring to FIG. 4, the wireless power transmitter 400 includes a DC power supply 410, an inverter 420, a signal matcher 430, a wireless power transmission unit 440, a controller 450, a communication unit 460, and a display 470.

The DC power supply 410 provides power in the form of a DC waveform that will be supplied to a wireless power receiver. For example, the DC power supply 410 may be implemented as a battery, or may be implemented as a device that supplies DC power by converting AC power received from an outside, e.g., an outlet, into DC power. A voltage Vdd applied to the DC power supply 410 may be changed under control of the controller 450.

The inverter 420 converts the DC power received from the DC power supply 410 into AC waveforms. A power frequency fs and a duty cycle τ of the inverter 420 may be changed under control of the controller 450.

The signal matcher 430 performs impedance matching between the AC power output from the inverter 420 and the wireless power transmission unit 440.

The wireless power transmission unit 440 transmits the impedance-matched AC power to the wireless power receiver in the form of an electromagnetic wave.

The communication unit 460 receives power information including power management information for each wireless power receiver and control information for the wireless power supply 400, from at least one wireless power receiver. For example, the communication unit 460 may periodically transmit a notice signal including a network ID of the wireless power transmitter 400 to a specific receiving target or may freely broadcast the notice signal all targets in a broadcast area.

Additionally, the communication unit 460 may receive a notice signal from another wireless power receiver and may transmit and receive specific signals while changing or switching channels. Transmit/receive channels of the communication unit 460 are determined by the controller 450, as described above with reference to FIGS. 3A and 3B.

The communication unit 460 detects the energy input from the surrounding ED and may receive a notice signal from another wireless power transmitter. The controller 450 determines an RSSI of the notice signal.

The controller 450 adjusts the transmit power by analyzing the power information received from the communication unit 460. In addition, the controller 450 may determine the channel used by the communication unit 460 based on the network ID of another wireless power transmitter, the ED, the RSSI, etc. Further, the controller 450 may generate a network ID of the wireless power transmitter 400.

The display 470, e.g., a Liquid Crystal Display (LCD) panel, a Light Emitting Diode (LED) array, etc., outputs input graphic data to a user. For example, the display 470 displays indicators for the wireless power receivers, indicating whether the wireless power receivers are set to receive or not receive power, an identifier of each of the wireless power receiver and its associated charging status, and the channel information used by the wireless power transmitter 400.

Figure 5:
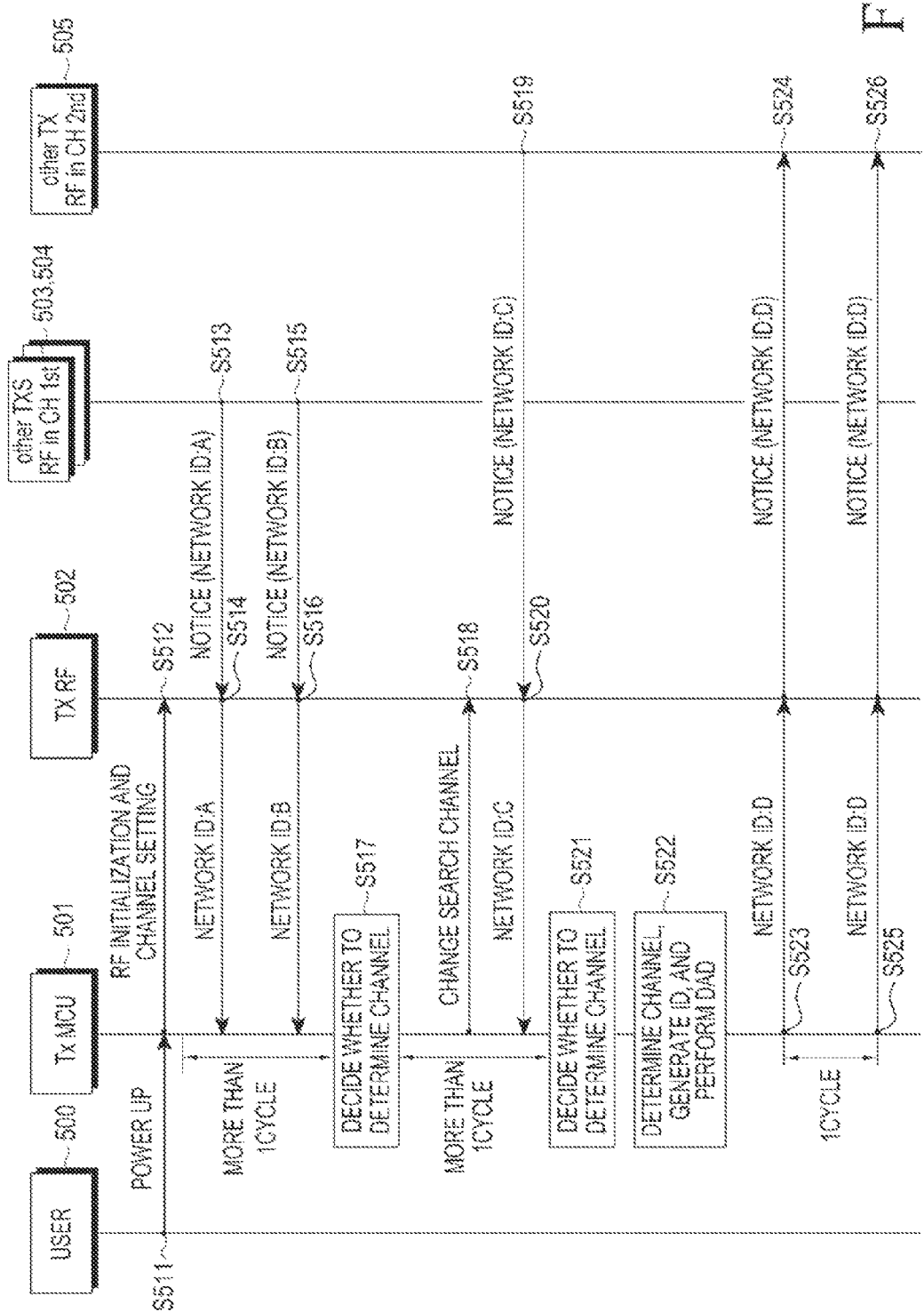
FIG. 5 is a timing diagram illustrating a channel decision process according to an embodiment of the present invention.

FIG. 5 is a timing diagram illustrating a channel decision process according to an embodiment of the present invention. Specifically. FIG. 5 illustrates the channel decision process between a controller (or TX MCU) 501, a communication unit (or TX RF) 502 of a wireless power transmitter, other wireless power transmitters 503 and 504 using a first channel, and another wireless power transmitter 505 using a second channel.

Referring to FIG. 5, a user 500 powers up the controller 501 of the wireless power transmitter in step S511. The controller 501 of the wireless power transmitter initializes the communication unit 502 of the wireless power transmitter and sets a channel in step S512. More specifically, the controller 501 determines a channel to be searched as an initial search channel, for example, channel 11, as defined in the IEEE 802.15.4 standard.

The other wireless power transmitters 503 and 504 that use the first channel, e.g., channel 11, may periodically transmit a notice signal in steps S513 and S515. For example, the notice signal transmitted by the other wireless power transmitters 503 and 504 may have the frame structure shown in Table 1, and network ID information of each wireless power transmitter may be included in a network ID field of the notice signal.

For example, the other wireless power transmitter 503 has a network ID of 'A', and the other wireless power transmitter 504 has a network ID of 'B'. In step S513, the wireless power transmitter 503 transmits a notice signal to the communication unit 502 of the wireless power transmitter, with network ID information of 'A' included in the network ID field. In step S515, the wireless power transmitter 504 transmits a notice signal to the communication unit 502 of the wireless power transmitter, with network ID information of 'B' included in the network ID field. The controller 501 of the wireless power transmitter determines that the other wireless power transmitters 503 and 504 have the network IDs of 'A' and 'B', respectively, by analyzing the notice signals in steps S514 and S516.

The controller 501 decides whether to determine a channel in step S517. The controller 501 may determine an RSSI of each of the notice signals received from the other wireless power transmitters 503 and 504, or an RSSI of an interference signal, or may determine a level of energy input to the first channel. The controller 501 may decide whether to determine a channel, based on at least one of the RSSI value and the energy level value. That is, the controller 501 may decide whether to determine the first channel as a communication channel. In FIG. 5, the controller 501 does not determine the first channel as a communication channel in step S517.

Accordingly, in step S518, the controller 501 controls the communication unit 502 of the wireless power transmitter to change the search channel. Under control of the controller 501, the communication unit 502 changes the search channel from the first channel to a second channel. For example, the second channel may be channel 24, as defined in the IEEE 802.15.4® standard. Alternatively, the controller 501 may change the searched channel based on a predetermined order as illustrated in FIG. 3C.

The other wireless power transmitter 505 using the second channel has a network ID of 'C'. The other wireless power transmitter 505 transmits a notice signal with network ID information of 'C' included in a network ID field in step S519. The controller 501 determines that the other wireless power transmitter 505 has a network ID of 'C', by analyzing the notice signal in step S520. The controller 501 of the wireless power transmitter then decides whether to determine the second channel as a communication channel in step S521. In FIG. 5, the controller 501 determines the second channel as a communication channel in step S521.

In step S522, the controller determines the second channel as a communication channel, generates a network ID of the wireless power transmitter, and determines whether the generated network ID is duplicated (Duplicated Address Detection (DAD)). The network ID may be used in a star network for the wireless power system.

In addition, the controller 501 determines whether the generated network ID is a duplicate of a network ID of another wireless power transmitter, i.e., if the network ID is already being used. Determining whether a network ID is duplicated will be referred to herein as 'DAD'. If the network ID of the wireless power transmitter is a duplicate of a network ID of another wireless power transmitter, a new network ID may be re-generated. For example, the controller 501 generates a network ID of 'D' as the new network ID.

The controller 501 generates a notice signal with the network ID of 'D' included in the network ID field, in steps S523 and S525. In addition, the controller 501 controls the communication unit 502 to transmit the notice signal to the other wireless power transmitter 505 that uses the second channel, in steps S524 and S526. For example, the communication unit 502 periodically broadcasts the notice signal.

The communication unit 502 receives notice signals from the other wireless power transmitters 503 and 504 that use another channel, e.g., the first channel. The communication unit 502 of the wireless power transmitter may wait to receive a notice signal on the channel for at least three cycles, under control of the controller 501. That is, the communication unit 502 of the wireless power transmitter may wait on the channel for at least three cycles, even though it fails to receive a notice signal from another wireless power transmitter.

Figure 6A:
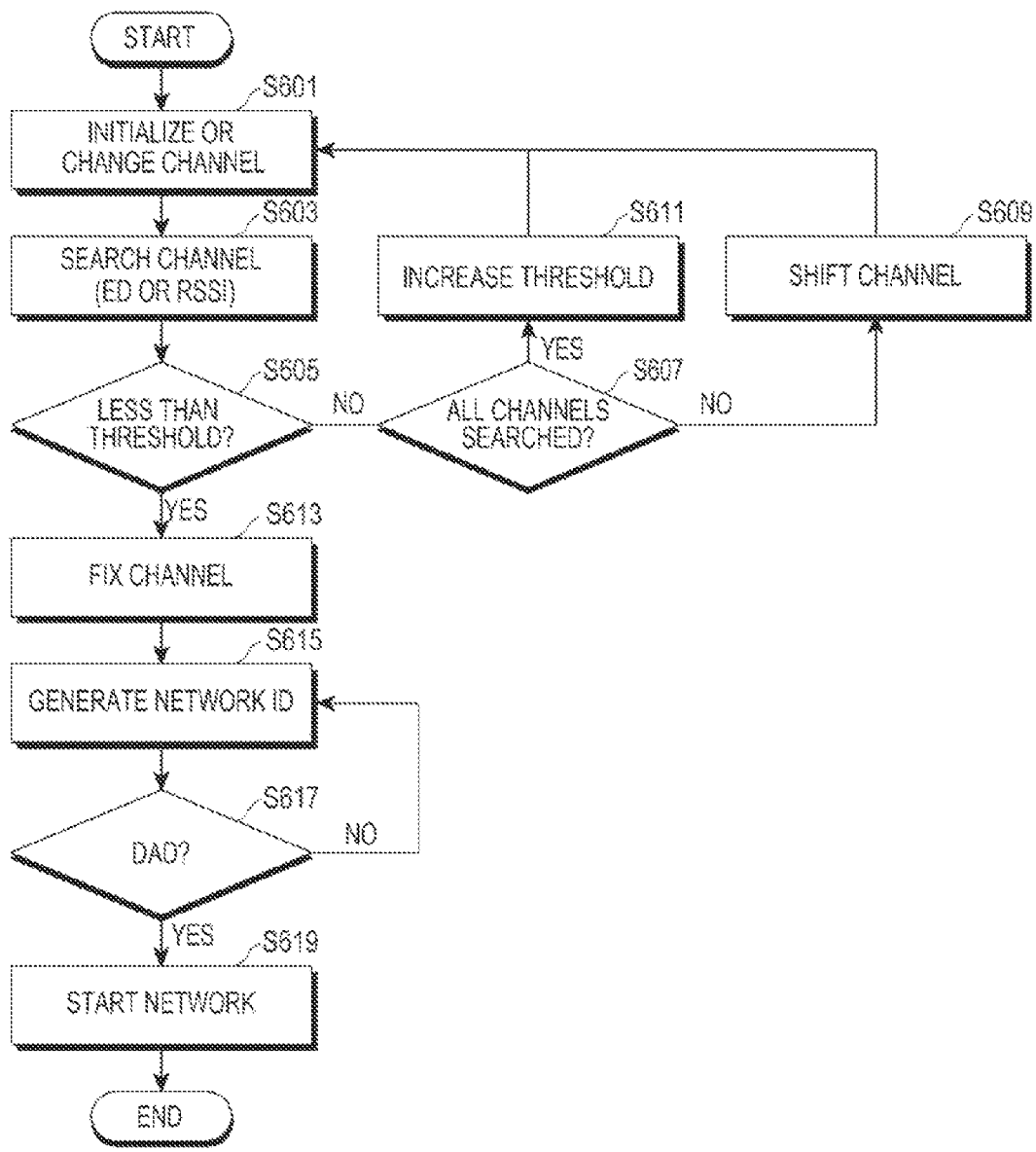
FIGS. 6A and 6B are flowcharts illustrating a channel decision process according to different embodiments of the present invention.
Figure 6B:
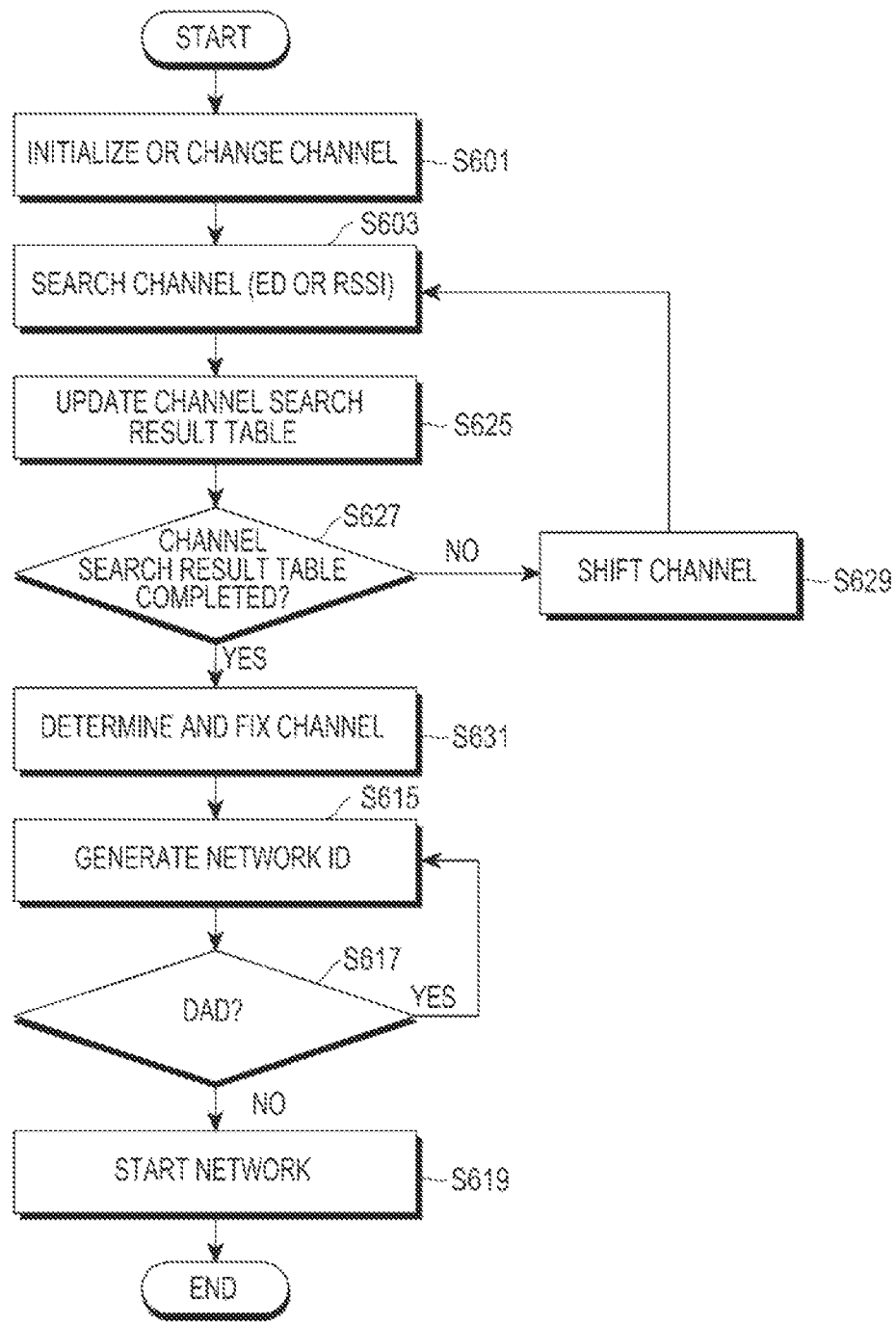

FIGS. 6A and 6B are flowcharts illustrating a channel decision process according to different embodiments of the present invention.

Referring to FIG. 6A, the wireless power transmitter initializes the search channel, upon power up, in step S601. The wireless power transmitter determines an initial search channel and scans at least one of an RSSI and an energy level of the search channel in step S603. The wireless power transmitter may determine at least one of an RSSI and an energy level of a search channel, as a criterion for determining a communication channel.

In step S605, the wireless power transmitter determines whether at least one of the RSSI and the energy level of the search channel is less than a predetermined threshold. If at least one of the RSSI and the energy level of the search channel is greater than or equal to the threshold, the channel is crowded by another wireless power transmitter or by other communications and should not be used. Accordingly, the wireless power transmitter fixes (determines) the search channel as a communication channel to be used for communication in step S613, if at least one of the RSSI and the energy level of the search channel is less than the threshold (Yes in step S605).

However, if at least one of the RSSI and the energy level of the search channel is greater than or equal to the threshold (No in step S605), the wireless power transmitter determine whether it has performed RSSI and ED level scanning for all channels in step S607. For example, the wireless power transmitter may determine whether it has searched for or scanned all of the IEEE 802.15.4 channels 11, 24, 15 and 20.

If the wireless power transmitter has not performed the scanning for all channels yet (No in step S607), the wireless power transmitter shifts the search channel in step S609. For example, if the initial search channel is the IEEE 802.15.4 channel 11, the wireless power transmitter may change or switch the search channel to the IEEE 802.15.4 channel 24. The wireless power transmitter may change the search channel based on, for example, a predetermined order as illustrated in FIG. 3C.

However, if the wireless power transmitter has fully performed the scanning for all channels (Yes in step S607), the wireless power transmitter increases the threshold in step S611. Basically, if the wireless power transmitter fails to determine a communication channel, even after performing the scanning for all channels, the wireless power transmitter may increase the threshold, determining that the threshold is set relatively lower.

If a communication channel is determined and fixed through the above process in step S613, the wireless power transmitter generates a network ID in step S615. In addition, the wireless power transmitter performs DAD in step S617 to determine whether the generated network ID is a duplicate of an already used network ID. If the network ID is duplicated (Yes in step S617), the wireless power transmitter may re-generate a network ID, i.e., generate a new network ID. If the network ID is not duplicated (No in step S617), the wireless power transmitter starts the network in step S619. For example, upon the network startup, the wireless power transmitter transmits a notice signal.

As described above, in accordance with an embodiment of the present invention, the wireless power transmitter immediately determines a channel as a communication channel, without scanning all of the channels, once a channel satisfying predetermined conditions is scanned.

In contrast to the embodiment illustrated in FIG. 6A, FIG. 6B illustrates an embodiment that scans all of the channels.

Referring to FIG. 6B, the wireless power transmitter initializes the search channel, upon power up, in step S601, and determines an initial search channel and scans at least one of an RSSI and an energy level of the search channel in step S603. The wireless power transmitter may determine at least one of an RSSI and an energy level of a search channel, as a criterion for determining a communication channel.

The wireless power transmitter updates a channel search result table by recording the search results in step S625. In step S627, the wireless power transmitter determine whether the channel search result table has been completed, as the search is performed for all channels. If the channel search result table has not been completed (No in step S627), i.e., if the search has not been performed for all channels, the wireless power transmitter shifts the search channel in step S629. The wireless power transmitter may scan at least one of an RSSI and an energy level for the shifted search channel.

If the channel search result table has been completed by the above process (Yes in step S627), the wireless power transmitter determines and fixes a communication channel in step S631. For example, the wireless power transmitter determines a channel with a lowest RSSI value or a lowest energy level as a communication channel. That is, the wireless power transmitter determines a communication channel by setting any one of the RSSI value and the energy level as a criterion. Also, the wireless power transmitter determines a communication channel using both the RSSI value and the energy level. Alternatively, the wireless power transmitter may determine a communication channel by analyzing an RSSI to determine the number of wireless power transmitters that use the relevant channel.

Once the communication channel is determined and fixed in step S631, the wireless power transmitter generates a network ID in step S615, performs DAD in step 617, and performs network startup in step S619.

As described above for FIGS. 6A and 6B, in determining a communication channel, the wireless power transmitter may scan either all channels or some channels.

FIG. 7 illustrates a channel search result table according to an embodiment of the present invention. The channel search result table includes data for a channel number, an address, an RSSI, and a noise level (i.e., an ED level) for each channel.

Figure 8A:
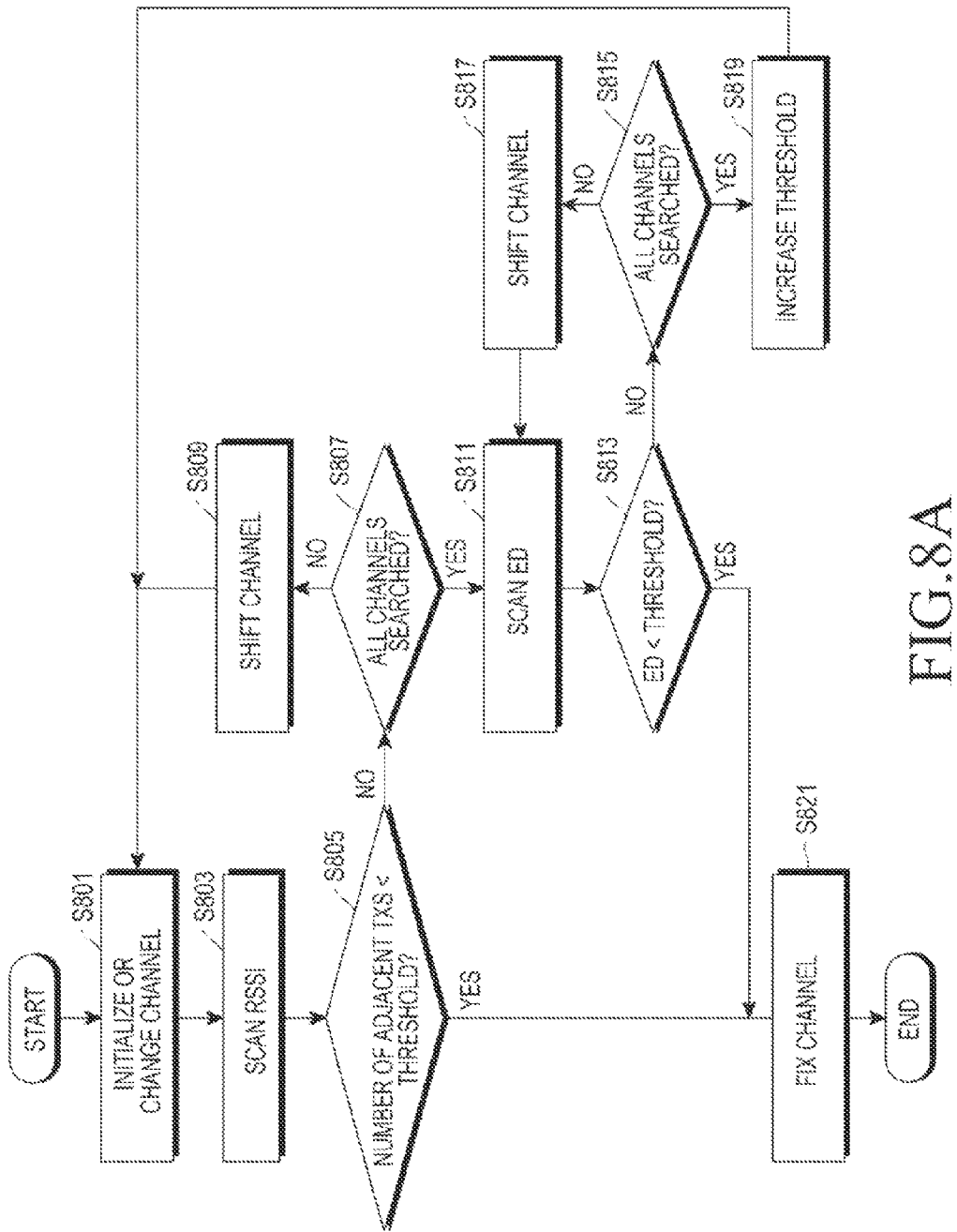
FIGS. 8A and 8B are flowcharts illustrating a communication channel decision process according to different embodiments of the present invention.
Figure 8B:
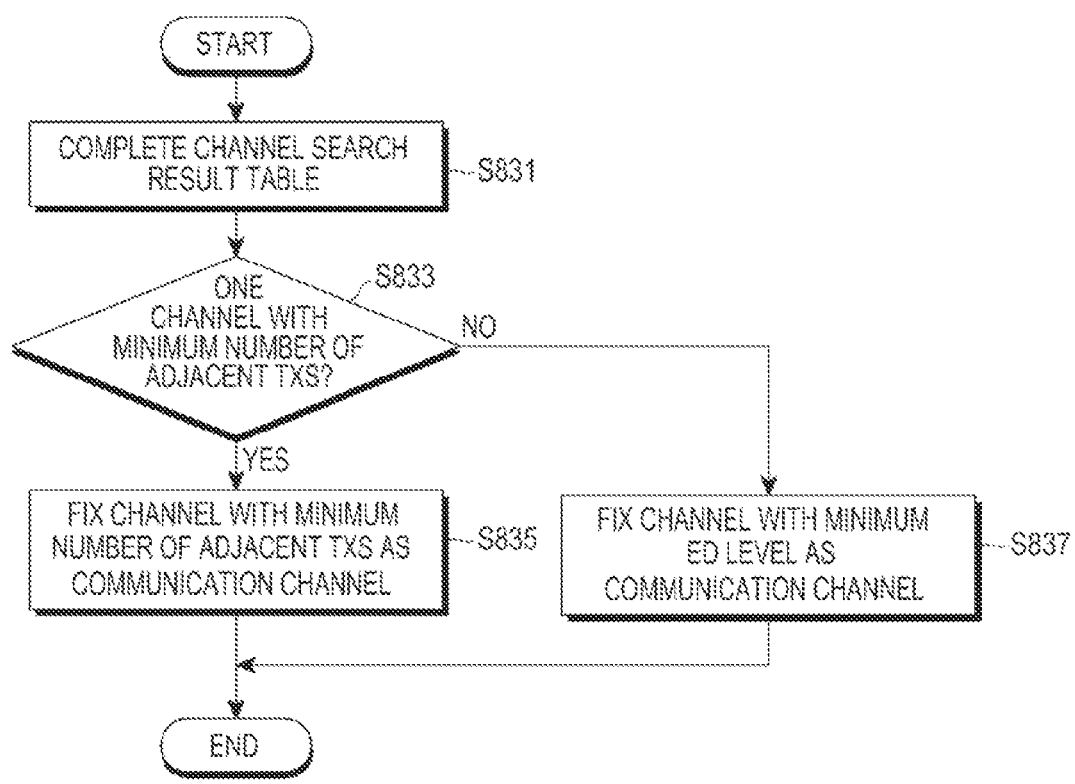

FIGS. 8A and 8B are flowcharts illustrating a communication channel decision process according to different embodiments of the present invention. In the examples of FIGS. 8A and 8B, it is assumed that the wireless power transmitter determines a communication channel based on a number of other wireless power transmitters that use a search channel, and on energy levels of signals from the other wireless power transmitters. In particular, in FIGS. 8A and 8B, the wireless power transmitter determines, as a criterion, the number of other wireless power transmitters that use the search channel, rather than the energy level.

Referring to FIG. 8A, the wireless power transmitter initializes a search channel in step S801. The wireless power transmitter scans an RSSI of the initial search channel in step S803, and determines the number of other wireless power transmitters that use the search channel, based on the scanning results.

In step S805, the wireless power transmitter determines whether the number of other wireless power transmitters that use the search channel is less than a predetermined threshold, e.g., 3. If the number of other wireless power transmitters that use the search channel is less than the threshold (Yes in step S805), the wireless power transmitter determines and fixes the search channel as a communication channel in step S821.

However, if the number of other wireless power transmitters that use the search channel is greater than or equal to the threshold (No in step S805), the wireless power transmitter determines whether it has performed the search for all channels in step S807.

If the wireless power transmitter has not performed the search for all channels (No in step S807), the wireless power transmitter changes (shifts) the search channel to another channel in step S809. For example, the wireless power transmitter may change the search channel based on a predetermined order as illustrated in FIG. 3C.

However, if the wireless power transmitter has performed the search for all channels (Yes in step S807), the wireless power transmitter scans an energy level in step S811. The wireless power transmitter may scan an energy level of the ongoing search channel, or may scan an energy level by initializing the search channel.

In step S813, the wireless power transmitter determines whether the energy level of the search channel is less than a predetermined threshold. If the energy level of the search channel is less than the threshold (Yes in step S813), the wireless power transmitter determines and fixes the search channel as a communication channel in step S821.

However, if the energy level of the search channel is greater than or equal to the threshold (No in step S813), the wireless power transmitter determines whether it has performed the search for all channels in step S815.

If the wireless power transmitter has not performed the search for all channels yet (No in step S815), the wireless power transmitter changes the search channel to another channel in step S817. For example, the wireless power transmitter may change the search channel based on a predetermined order as illustrated in FIG. 3C.

However, if the wireless power transmitter has performed the search for all channels (Yes in step S815), the wireless power transmitter increases the threshold in step S819 and repeats the above-described process.

In an alternative embodiment, if the wireless power transmitter has not performed the search for all channels yet (No in step S807), the wireless power transmitter may increase the threshold.

As described above, the wireless power transmitter may determine the communication channel on which it will perform communication, and may generate a unique network ID.

FIG. 8B is a flowchart illustrating a control method in a wireless power transmitter according to an embodiment of the present invention.

Referring to FIG. 8B, the wireless power transmitter completes a channel search result table by scanning an energy level and an RSSI value for all channels in step S831. The wireless power transmitter determines the number of other wireless power transmitters that use each channel, based on the RSSI value in the channel search result table.

If there is a channel for which the number of other wireless power transmitters that use the channel is a minimum (Yes in step S833), the wireless power transmitter determines the channel as a communication channel in step S835. However, if there are multiple channels for which the number of other wireless power transmitters that use the channels is a minimum (No in step S833), the wireless power transmitter determines a channel with the lowest energy level among the channels, as a communication channel in step S837.

Figure 9A:
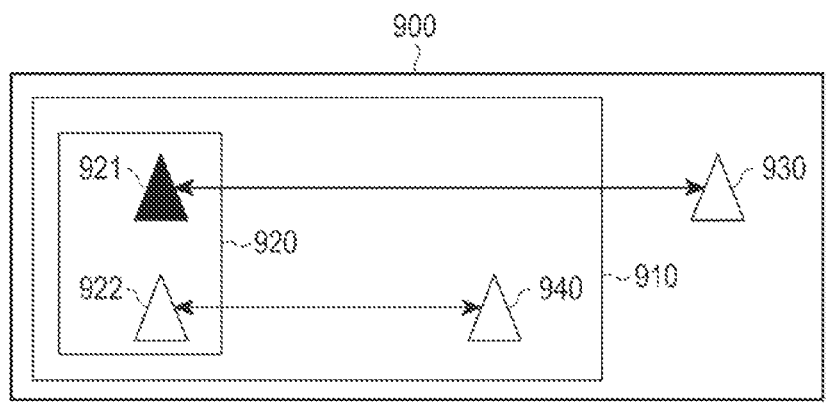
FIG. 9A illustrates a network system according to an embodiment of the present invention.

FIG. 9A illustrates a network system according to an embodiment of the present invention.

Referring to FIG. 9A, the network system 900 includes a wireless power transmitter 910, a wireless power receiver 920, and a Wi-Fi repeater 930. The wireless power receiver 920 includes a Wi-Fi communication module 921 and a wireless charging communication module 922. The Wi-Fi communication may use, for example, a 100 Mbps UDP packet transmission scheme, and the wireless charging communication may use, for example, a 250 kbps packet transmission scheme at a frequency of an IEEE 802.15.4 channel 24.

FIG. 9B is a table illustrating execution results from a network system according to an embodiment of the present invention. Specifically, FIG. 9B illustrates execution results in an ordinary office environment.

Referring to FIG. 9B, a transmitting failure count is 3034 and 6193 when there is no wireless power receiver and when there are five wireless power receivers, respectively, and the associated failure rates are 0.002337% and 0.004546%, respectively. Based on these results, a channel decision scheme by the present invention may acquire the excellent communication results. In addition, it should be understood that the wireless charging communication does not affect Wi-Fi communication.

As is apparent from the foregoing description, various embodiments of the present invention provide a configuration in which a wireless power transmitter selects a channel for communicating with a wireless power receiver, while minimizing conflicts with other communications channels. Particularly, in the a current communication environment in which Wi-Fi repeaters are widely installed, the wireless power transmitter may select a communication channel, while minimizing conflicts with Wi-Fi channels.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a wireless power transmitter for transmitting wireless power to at least one wireless power receiver, the method comprising:
   setting, by the wireless power transmitter, a search channel to be used for communication with the at least one wireless power receiver, wherein the search channel is predetermined according to a first communication scheme;
   detecting at least one of an energy level of a signal received on the search channel and a Received Signal Strength Indication (RSSI) value of the signal received on the search channel, wherein the signal is generated by another electronic device using a second communication scheme; and
   determining whether to designate the search channel as a communication channel based on the detection results,
   wherein the another electronic device is separated from the wireless power transmitter or the wireless power receiver, and
   wherein the first communication scheme is different from the second communication scheme.

2. The method of claim 1, wherein determining whether to designate the search channel comprises:
   determining whether the at least one of the energy level and the RSSI value of the received signal is less than a predetermined threshold; and
   designating the search channel as the communication channel, when the at least one of the energy level and the RSSI value is less than the predetermined threshold.

3. The method of claim 2, further comprising changing the search channel to another channel, when the at least one of the energy level and the RSSI value of the received signal is greater than or equal to the predetermined threshold.

4. The method of claim 3, further comprising:
   determining whether there is a remaining another channel, when at least one of an energy level and an RSSI value of a signal received on the changed search channels is greater than or equal to the threshold; and
   increasing the threshold, when there is no remaining another channel.

5. The method of claim 4, further comprising:
   determining whether at least one of an energy level and an RSSI value of a signal received on a search channel is less than the increased threshold; and
   designating the search channel as the communication channel, if the at least one of the energy level and the RSSI value is less than the increased threshold.

6. The method of claim 1, wherein determining whether to designate the search channel comprises:
   detecting at least one of an energy level and an RSSI value of a received signal over each of a plurality of search channels; and
   designating, as the communication channel, a search channel from among the plurality of search channels having a smallest at least one of an energy level and an RSSI value.

7. The method of claim 1, further comprising generating a network Identifier (ID) of the wireless power transmitter based on a notice signal received from another wireless power transmitter.

8. The method of claim 7, wherein the network ID is different from a network ID of the another wireless power transmitter.

9. The method of claim 7, further comprising generating a notice signal including the generated network ID, and transmitting the generated notice signal.

10. The method of claim 9, wherein the notice signal further includes at least one of protocol version information, a sequence number, information about a wireless power receiver, and information about a number of wireless power receivers in management.

11. The method of claim 1, further comprising determining a number of other wireless power transmitters that use the search channel, based on the detection results.

12. The method of claim 11, further comprising designating the search channel as the communication channel, when the number of the other wireless power transmitters that use the search channel is less than a predetermined number.

13. The method of claim 11, further comprising designating the search channel as the communication channel, when the search channel energy level is less than a predetermined threshold, and the number of the other wireless power transmitters that use the search channel is greater than or equal to a predetermined number.

14. A wireless power transmitter for transmitting wireless power to at least one wireless power receiver, the wireless power transmitter comprising:
   a controller that sets a search channel to be used for communication with the at least one wireless power receiver, wherein the search channel is predetermined according to a first communication scheme; and
   a communication unit that receives a signal on the search channel, wherein the signal is generated by another electronic device using a second communication scheme;
   wherein the controller detects at least one of an energy level of the received signal and a Received Signal Strength Indication (RSSI) value of the received signal, and determines whether to designate the search channel as a communication channel, based on the detection results,
   wherein the another electronic device is separated from the wireless power transmitter or the wireless power receiver, and
   wherein the first communication scheme is different from the second communication scheme.

15. The wireless power transmitter of claim 14, wherein the controller determines whether the at least one of the energy level and the RSSI value of the received signal is less than a predetermined threshold, and designates the search channel as the communication channel, when the at least one of the energy level and the RSSI value is less than the predetermined threshold.

16. The wireless power transmitter of claim 15, wherein the controller changes the search channel to another channel, if the at least one of the energy level and the RSSI value of the received signal is greater than or equal to the predetermined threshold.

17. The wireless power transmitter of claim 16, wherein the controller determines whether there is a remaining another channel, when at least one of an energy level and an RSSI value of a signal received on the changed search channels is greater than or equal to the threshold, and increases the threshold, when there is no remaining another channel.

18. The wireless power transmitter of claim 17, wherein the controller determines whether at least one of an energy level and an RSSI value of a signal received on a search channel is less than the increased threshold, and determines the search channel as the communication channel, if the at least one of the energy level and the RSSI value is less than the increased threshold.

19. The wireless power transmitter of claim 14, wherein the controller detects at least one of an energy level and an RSSI value of a received signal over each of a plurality of search channels, and designates, as the communication channel, a search channel from among the plurality of search channels having a smallest at least one of an energy level and an RSSI value.

20. The wireless power transmitter of claim 14, wherein the controller generates a network Identifier (ID) of the wireless power transmitter based on a notice signal received from another wireless power transmitter.

21. The wireless power transmitter of claim 20, wherein the network ID is different from a network ID of the another wireless power transmitter.

22. The wireless power transmitter of claim 20, wherein the communication unit generates a notice signal including the generated network ID, and transmits the generated notice signal.

23. The wireless power transmitter of claim 22, wherein the notice signal further includes at least one of protocol version information, a sequence number, information about a wireless power receiver, and information about a number of wireless power receivers in management.

24. The wireless power transmitter of claim 14, wherein the controller determines a number of other wireless power transmitters that use the search channel, based on the detection results.

25. The wireless power transmitter of claim 24, wherein the controller designates the search channel as the communication channel, if the number of the other wireless power transmitters that use the search channel is less than a predetermined number.

26. The wireless power transmitter of claim 24, wherein the controller designates the search channel as the communication channel, when the search channel energy level is less than a predetermined threshold, and the number of the other wireless power transmitters that use the search channel is greater than or equal to a predetermined number.

* * * * *